(12) United States Patent
Barber et al.

(10) Patent No.: US 6,208,121 B1
(45) Date of Patent: Mar. 27, 2001

(54) SWITCHING POWER SUPPLY WITH AC WAVEFORM CAPABILITY

(75) Inventors: John P. Barber, Kettering; Antonios Challita, Bellbrook; Robert C. Cravens, II, Bethel, all of OH (US)

(73) Assignee: IAP Research, Inc., Dayton, OH (US)

( * ) Notice: Subject to any disclaimer, the term of this patent is extended or adjusted under 35 U.S.C. 154(b) by 0 days.

(21) Appl. No.: 09/233,405

(22) Filed: Jan. 19, 1999

Related U.S. Application Data

(60) Provisional application No. 60/071,999, filed on Jan. 20, 1998.

(51) Int. Cl.[7] .................................................. G05F 1/10
(52) U.S. Cl. ............................................................ 323/222
(58) Field of Search ................................... 323/222, 266, 323/271, 273–277, 282, 284–286; 363/95, 97, 131

(56) References Cited

U.S. PATENT DOCUMENTS

| | | |
|---|---|---|
| 4,002,963 | 1/1977 | Hunter . |
| 4,006,391 | 2/1977 | Deering et al. . |
| 4,121,136 * | 10/1978 | Fournier et al. .................... 315/205 |
| 4,250,469 | 2/1981 | Cooper et al. . |
| 4,318,167 | 3/1982 | Angquist . |
| 4,419,615 | 12/1983 | Muto et al. . |
| 4,615,000 | 9/1986 | Fujii et al. . |
| 4,636,711 | 1/1987 | Freymuth . |
| 4,924,373 | 5/1990 | Inaba et al. . |
| 5,077,540 | 12/1991 | Keith et al. . |
| 5,089,767 | 2/1992 | Neidorff . |
| 5,099,408 | 3/1992 | Chen et al. . |
| 5,206,540 | 4/1993 | de Sa e Silva et al. . |
| 5,371,666 | 12/1994 | Miller . |
| 5,422,562 | 6/1995 | Mammano et al. . |
| 5,770,940 * | 6/1998 | Goder .................................... 323/282 |
| 5,774,323 * | 6/1998 | Innes et al. ........................... 361/187 |
| 5,804,944 * | 9/1998 | Alberkrack et al. ................. 320/163 |

* cited by examiner

Primary Examiner—Matthew Nguyen
(74) Attorney, Agent, or Firm—Jacox, Meckstroth & Jenkins

(57) ABSTRACT

A switching power supply which generates AC power, as opposed to DC power. A transistor opens and closes to thereby generate charge-discharge cycles through an inductor-resistor combination. Each charging current is compared with a reference waveform which changes slowly over time, compared with the opening and closing of the transistor. When each charging current exceeds the then-current value of the waveform, the transistor is opened, inducing a discharge cycle. This operation produces an output power waveform which is a replica of the reference waveform.

12 Claims, 19 Drawing Sheets

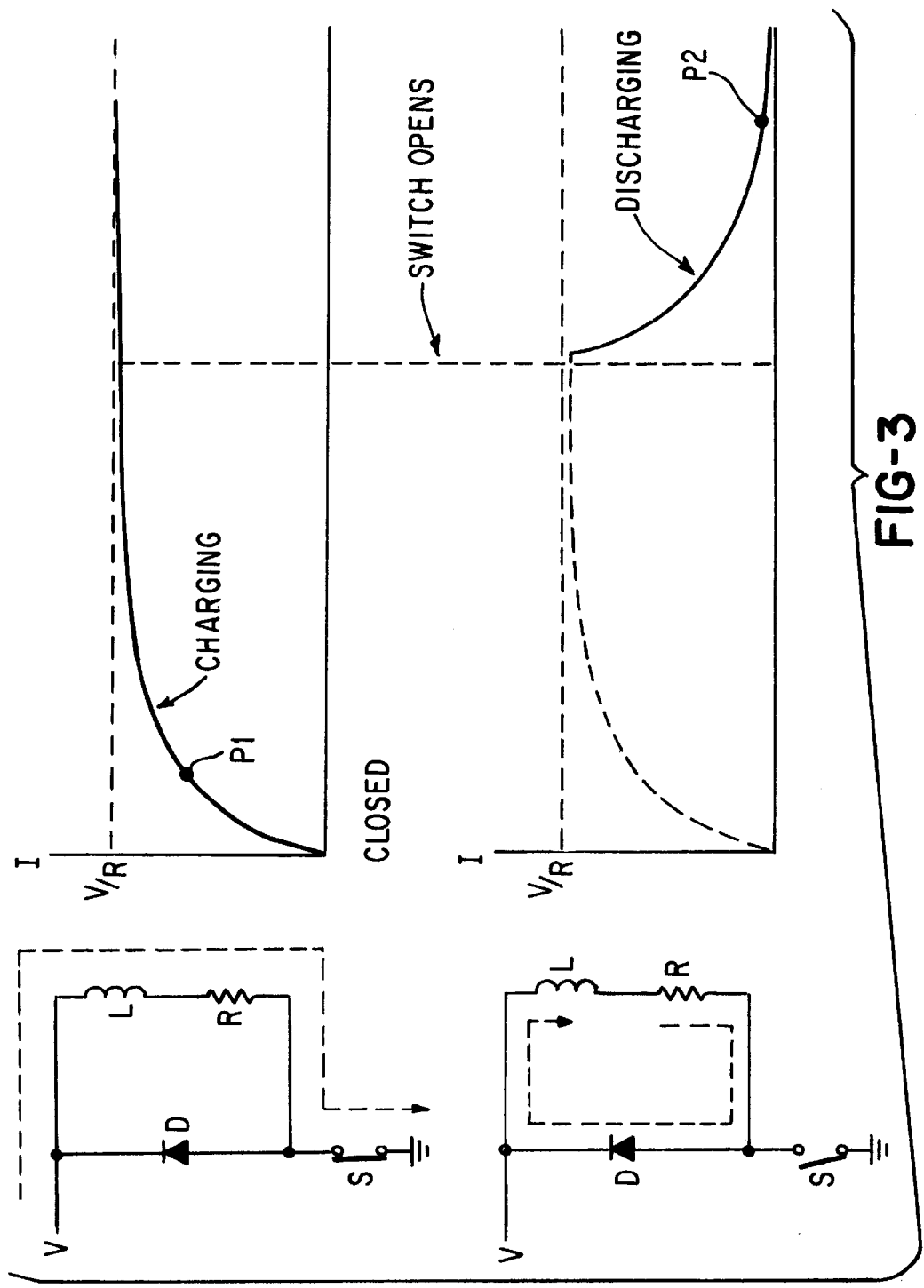

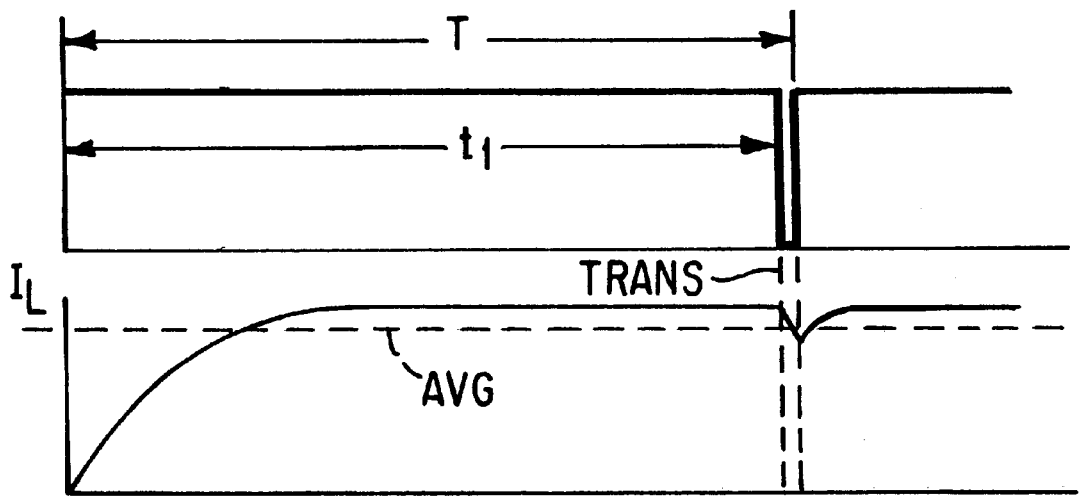
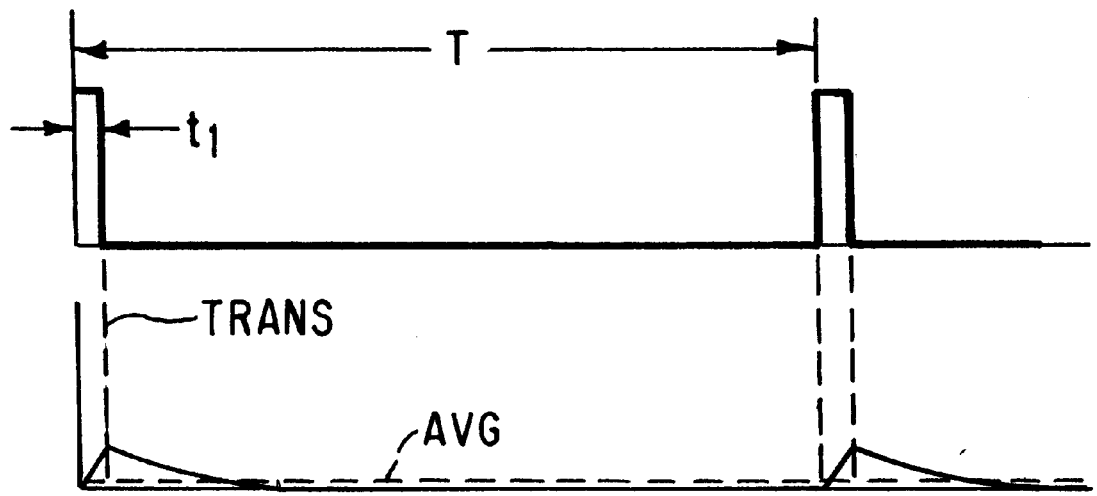

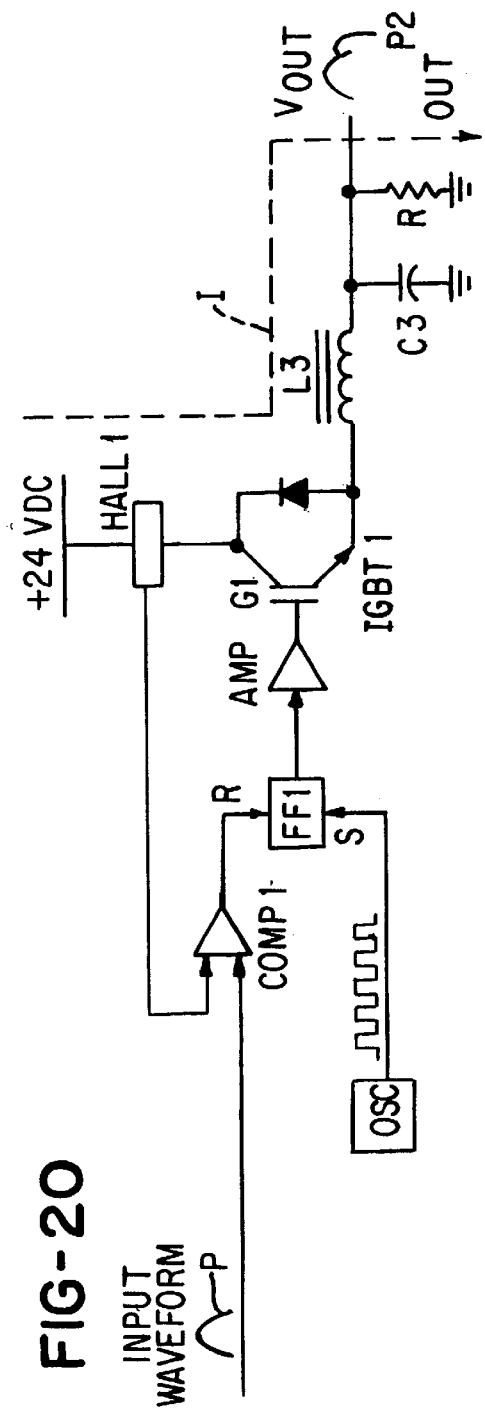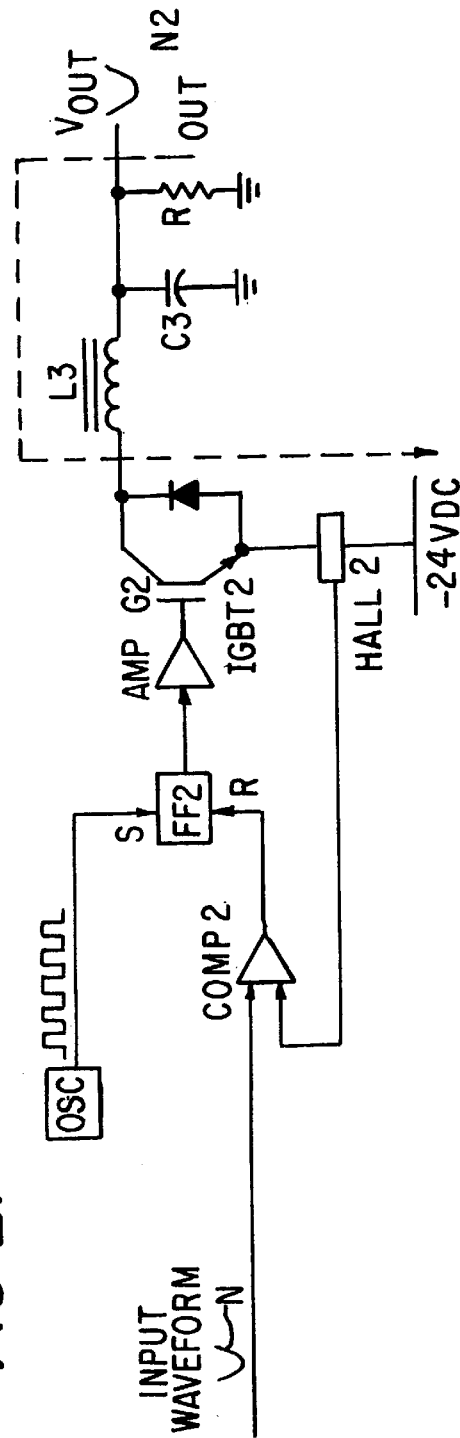
FIG-20
FIG-21

SWITCHING POWER SUPPLY WITH AC WAVEFORM CAPABILITY

CROSS-REFERENCE TO RELATED APPLICATION

This application is related to provisional patent application Serial No. 60/071,999, filed Jan. 20, 1998, to which Applicants claim the benefit of the earlier filing date.

SUMMARY OF THE INVENTION

The invention concerns a power supply which converts DC power to AC output power, in which the shape of the waveform of the output, as well as its frequency, can be controlled.

BACKGROUND OF THE INVENTION

FIG. 1 shows a simplified "buck" type voltage regulator. Such regulators provide very high performance in terms of constant output voltage, low output ripple voltage, and controlled transient behavior. These performance advantages are somewhat offset by the facts that they can be heavy and bulky. These regulators are used to convert a high DC voltage into a lower DC voltage.

The regulator alternates between the two conditions shown in FIG. 1A and FIG. 1B. In FIG. 1A, the switch S is closed, and a charging current $I_{CHARGE}$ flows through the inductor L. In FIG. 1B, the switch S is open, and a discharging current $I_{DISCH}$ flows through diode D. If it is assumed that capacitor C is large, so that $V_C$ remains constant, and that the switch S and diode D are ideal elements, then FIG. 2 illustrates the approximate behavior of the apparatus of FIGS. 1A and 1B.

FIG. 2A illustrates the time-behavior of switch S. A duty cycle D is defined as the ratio of $t_1/T$, as indicated. FIG. 2B illustrates the current $I_L$ through the inductor L. The current remains positive at all times, and swings from $I_{L1}$ to $I_{L2}$, and back. FIG. 2C illustrates the voltage $V_L$ across the inductor. It swings from a positive value of $(V_1-V_C)$ to a negative value of $(-V_C)$.

FIG. 2D illustrates the voltage across diode D. When the switch S is closed, $V_1$ appears across the diode D. When the switch S is open, a zero voltage appears across the diode, because the diode is assumed to be ideal.

FIG. 2E illustrates the voltage across the switch S. In a sense, this voltage is opposite to that across the diode D. When the switch S is open, $V_1$ appears across the switch S. When the switch S is closed, a zero voltage appears across the switch S.

FIG. 2F illustrates the current $I_C$ flowing into the capacitor. When the switch S is closed, the capacitor C charges. When the switch S opens, inductor L is placed in parallel with the capacitor C, but with a negative voltage, thereby causing the current charging the capacitor C to diminish, in region R1 in FIG. 2F, and then to become negative, in region R2, which represents a discharge of capacitor C. Then, when the switch S closes again, in region R3, the capacitor C charges again. The hatched regions represent equal charges, because current multiplied by time equals charge.

The plots of FIG. 2 are justified by the following equations. The variables are defined in FIGS. 1A, 1B and 2.

$V_1$=constant $V_C$=average "on" time of switch=$D*V_1$ $V_L=L\, dI_L/dt$

Switch off: $V_C=L(DEL\ I_L)/(DEL\ T)=L(I_{L2}-I_{L1})/t_1 \rightarrow I_{L2}-I_{L1}=V_C t_1/L$ Switch on: $V_1-V_C=L(DEL\ I_L)/(DEL\ T)=L(I_{L2}-I_{L1})/t_2 \rightarrow I_{L2}-I_{L1}=t_2(V_1-V_C)/L$ The preceding four equations justify FIG. 2B. FIG. 2C is based on an application of Kirchoff's voltage Law (KVL) to FIGS. 1A and 1B, and the stipulation that $V_C$ is constant. FIGS. 2D and 2E are also based on KVL.

FIG. 2F is based on the fact that the steady-state average of $I_C$ must be zero.

$I_R=V_2/R$ $I_{L(avg)}=(I_{L1}+I_{L2})/2=V_2/R \text{-->>} I_{L2}+I_{L1}=2V_2/R$ Combining the last with the "switch on" equations gives $I_{L2}=V_2(I_{L(avg)}/R+t_1/2L)$ $I_{L1}=V_2(I_{L(avg)}/R-t_1/2L)$ The capacitor ripple current is computed by $I_C=I_L-V_C/R$ This equation justifies the shape of the plot in FIG. 2F: it is the plot of FIG. 2B, minus a constant, namely $V_C/R$. The following two equations determine the vertical position of the plot of FIG. 2F.

$I_{C2}=I_{L2}-(I_{L1}+I_{L2})/2=(I_{L2}-I_{L1})/2$ $I_{C1}=I_{L1}-(I_{L1}+I_{L2})/2=-(I_{L2}-I_{L1})/2$

It can be shown that, if the inductance L has an internal resistance r, then $V_C$ equals $V_1$ multiplied by the factor $[R/(R+r)]\times D$. $V_1$ has been reduced. The buck regulator acts as a voltage reducer.

The regulator just described provides a DC output, with a small ripple. In some situations, an AC output is desired.

SUMMARY OF THE INVENTION

An object of the invention is to provide an improved power converter.

In one aspect, this invention comprises a switching power supply, which contains a switch which pulses current through an inductor, the improvement comprising means for measuring a current controlled by the switch and means for comparing that current with a time-varying reference and, at the time of comparison, if the current exceeds the reference, opening the switch.

In another aspect, this invention comprises method of operating a switching power supply, comprising the steps of applying a voltage to an inductor-resistor combination, to generate an increasing current in the combination, comparing a signal indicating the current with a time-varying reference and if the current attains a predetermined relation to the reference, removing said voltage from the combination.

In still another aspect, this invention comprises a switching power supply improvement comprising means for generating a reference AC waveform and means for generating an output waveform which is a magnified replica of the reference waveform.

In yet another aspect, this invention comprises a power supply which receives an input waveform and supplies current to a load (R) comprising a capacitor in parallel with the load (R), an inductor in series with the capacitor, a first switch (IGBT1), which sources current to the inductor, when closed, a second switch (IGBT2), which sinks current from the inductor, when closed, a first flip-flop (FF1), whose output controls closure of the first switch (IGBT1), a second flip-flop (FF2), whose output controls closure of the second switch (IGBT2), a clock connected to the set (S) inputs of both flip-flops, first and second current measurement means (HALL1, HALL2) for measuring current through the respective first and second switches (IGBT1, IGBT2), a first comparator (COMP1) for comparing measured current through the first switch (IGBT1) with the input waveform and, when the former exceeds the latter, applying a reset signal to the first flip-flop (FF1), to thereby open the first switch (IGBT1), and a second comparator (COMP2) for comparing measured current through the second switch (IGBT2) with the waveform and, when the former exceeds the latter, applying a reset signal to the second flip-flop (FF2), to thereby open the second switch (IGBT1) wherein a signal is generated in the load (R) which approximately replicates the input waveform.

A further object of the invention is to provide a voltage regulator which produces a controllable waveform.

In one form of the invention, a buck regulator is used to provide a high-current, high-voltage replica of a reference waveform.

Other objects and advantages of the invention will be apparent from the following description, the accompanying drawings, and the appended claims.

BRIEF DESCRIPTION OF THE DRAWINGS

FIG. 3 illustrates one form of the invention;

FIGS. 5 and 6 illustrate how the duty cycle of the clock controls the average value, AVG, of the current in the apparatus of FIG. 3;

FIG. 20 illustrates operation of the apparatus of FIG. 19 during a positive half-cycle of the INPUT WAVEFORM; and FIG. 21 illustrates operation of the apparatus of FIG. 19 during a negative half-cycle of the INPUT WAVEFORM.

DETAILED DESCRIPTION OF THE INVENTION

Figure 1A:
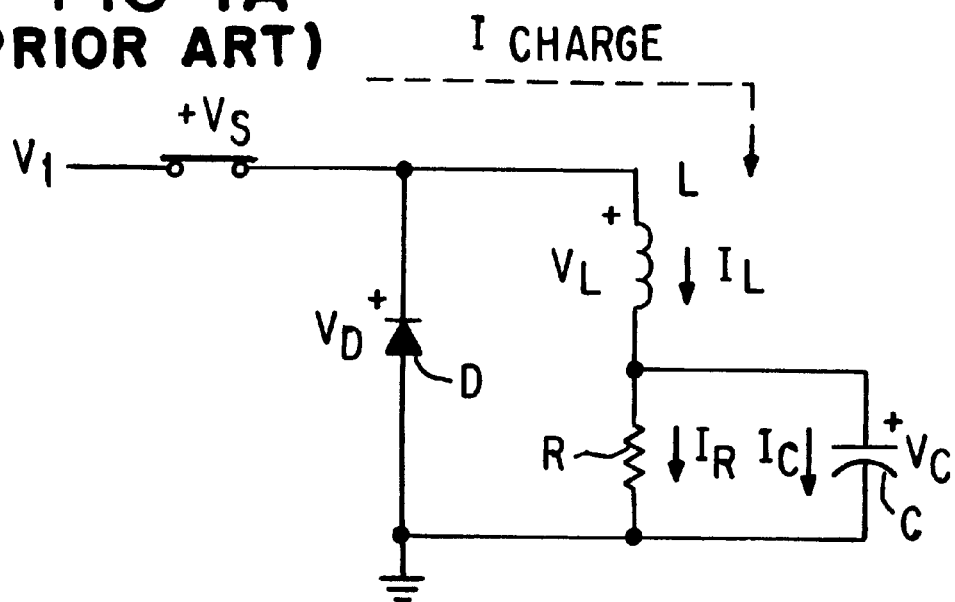
FIGS. 1A and 1B illustrate a prior-art buck regulator.
Figure 1B:
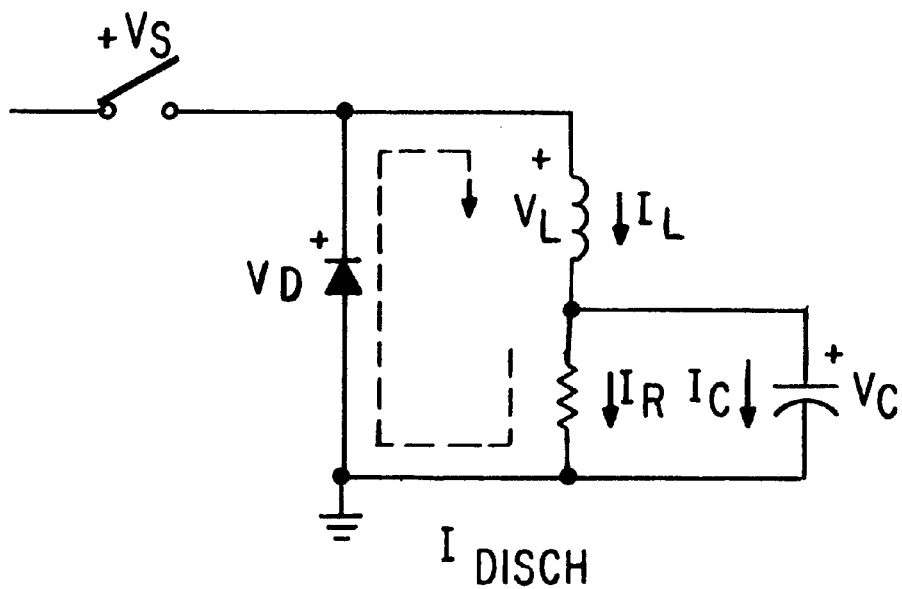
Figure 2A:
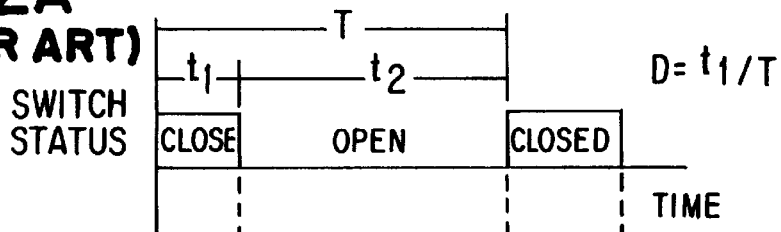
FIGS. 2A–2F illustrate plots of the behavior of the regulator of FIGS. 1A and 1B.
Figure 2B:
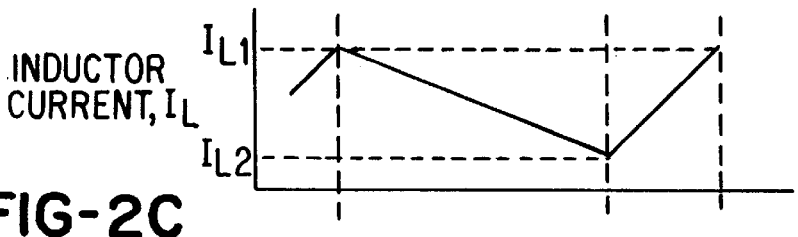
Figure 2C:
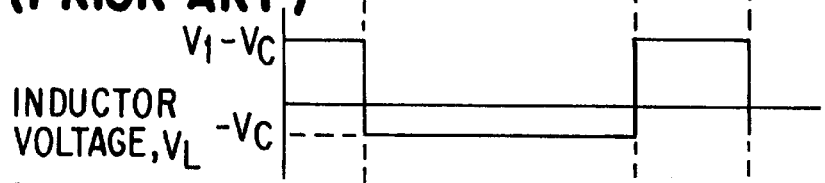
Figure 2D:
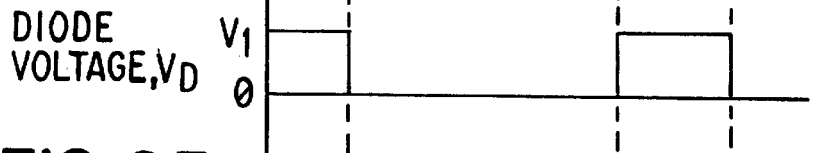
Figure 2E:
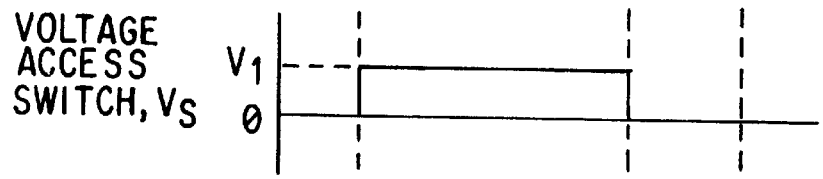
Figure 2F:
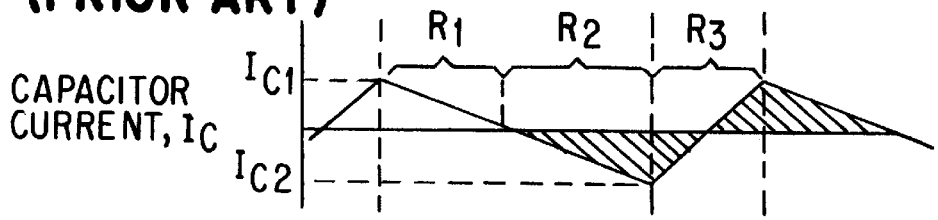

FIGS. 1A and 1B was used to provide a simple analysis of a buck regulator. FIG. 3 shows the apparatus of FIGS. 1A and 1B, but with the capacitor C removed, and the switch S located at a different position. In FIG. 3, immediately after the switch S closes, the current I rises toward the value V/R, as indicated by the plot labeled CHARGING, at the upper right part of the Figure. When the switch S opens, the current I immediately begins discharging toward zero, as indicated by the plot labeled DISCHARGING, at the lower right part of the Figure.

Figure 4:
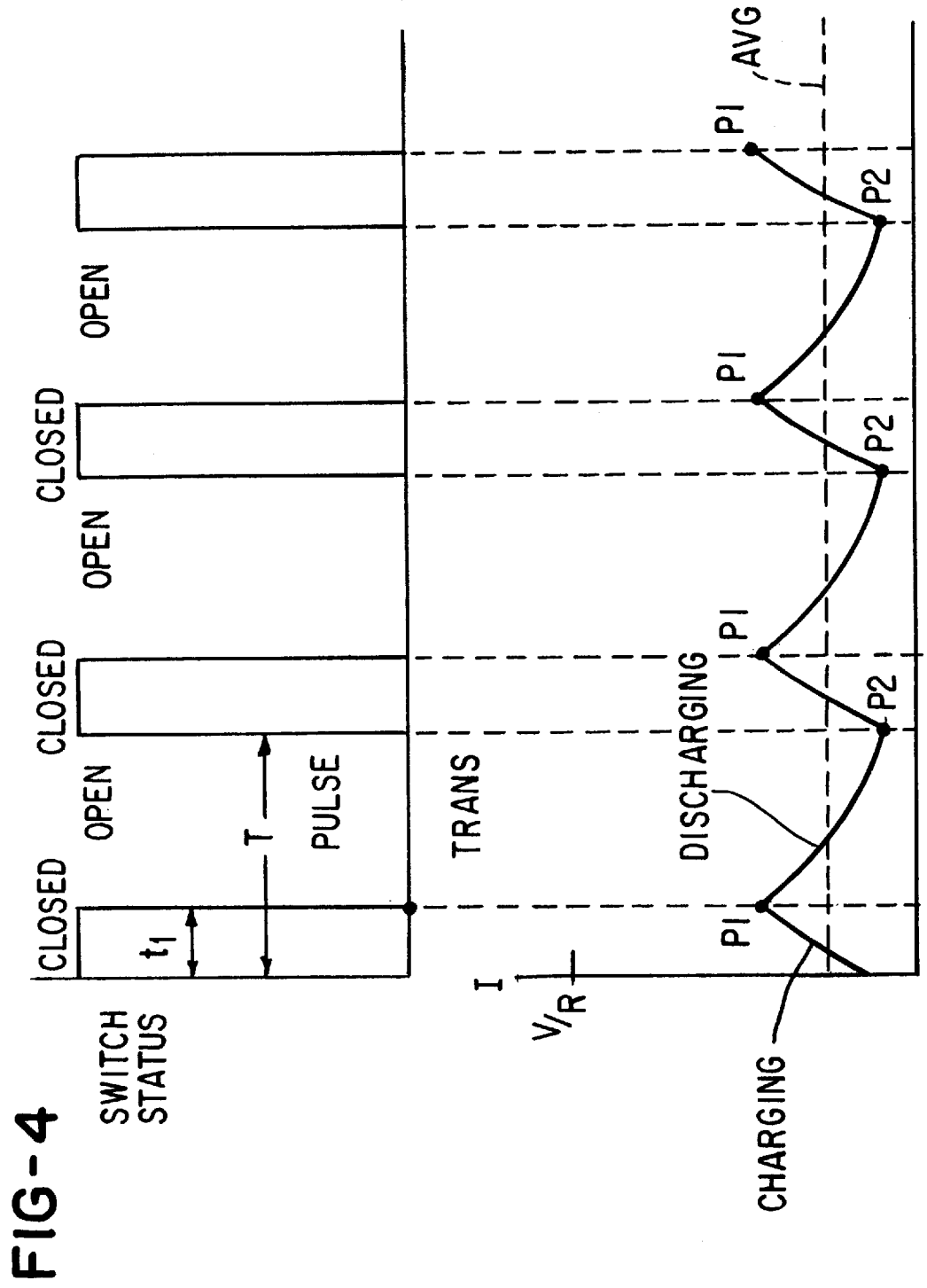
FIG. 4 illustrates a plot of the behavior of the apparatus of FIG. 3, when the switch is opened and closed by a clock.

FIG. 4 is a plot of a sequence of the events shown in FIG. 3, which occur when the switch S repeatedly opens and closes. However, in FIG. 4, the CHARGING plot in FIG. 3 is not allowed to reach the value V/R, because the switch S is opened when the current I reaches point P1 at the lower part of FIG. 4. Also, the DISCHARGING plot is not allowed to reach zero, because the switch S is closed when the current I reaches point P2. Consequently, the sequence shown in FIG. 4 is obtained. An average current, indicated by the dashed line AVG, is attained.

This average value depends on the relative position of the transition point TRANS within the period T, shown in the upper part of FIG. 4. For example, if point TRANS is close to the termination point of T, as in FIG. 5, the average AVG will be large. Conversely, if point TRANS is close to the beginning of T, as in FIG. 6, the average AVG will be small.

The fact that the relative position of TRANS within T allows control of the average current through resistor R in FIG. 3 enables the invention to obtain arbitrary, and programmable, waveforms of the current through resistor R.

Figure 7:
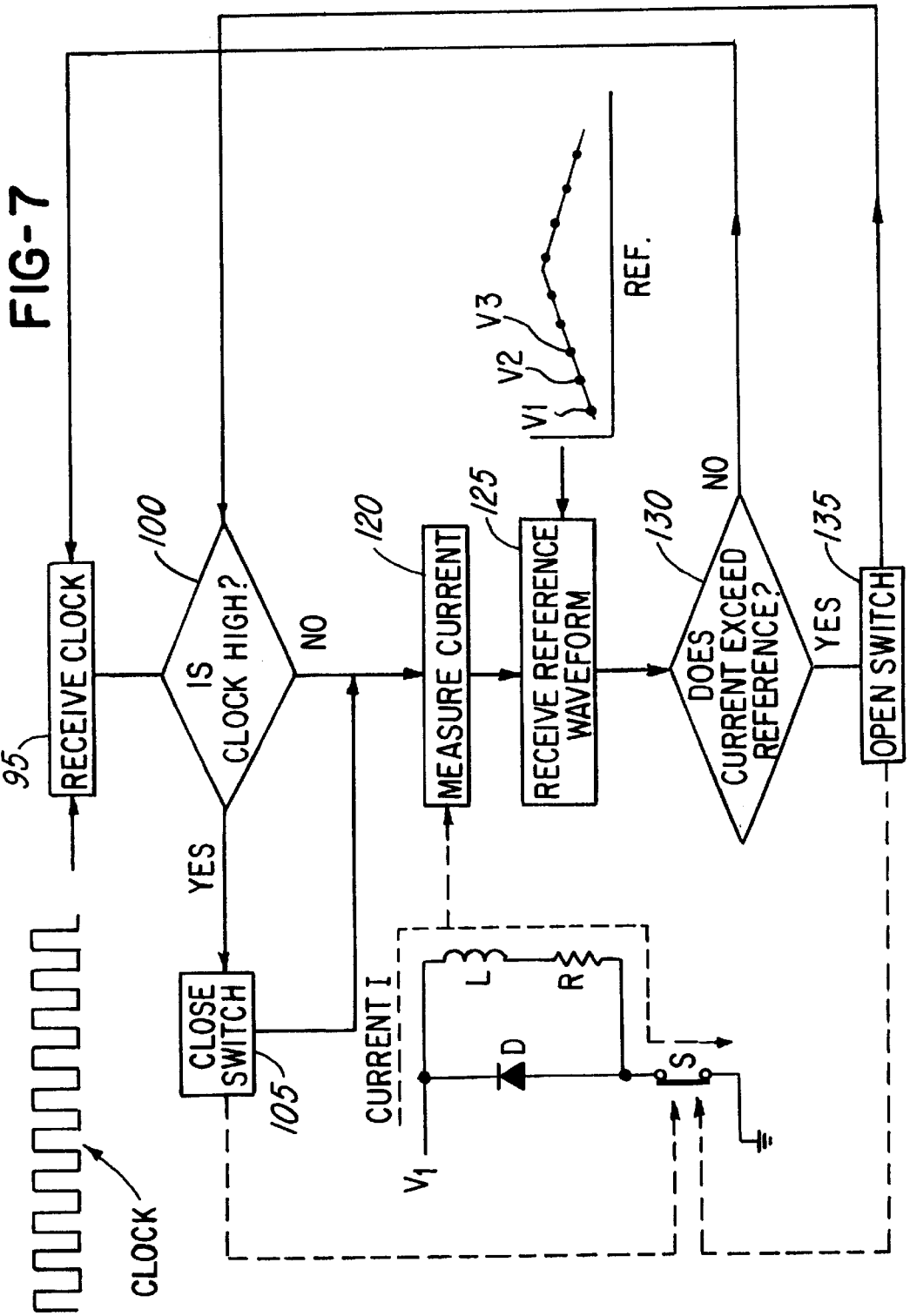
FIG. 7 illustrates one form of the invention.
Figure 8:
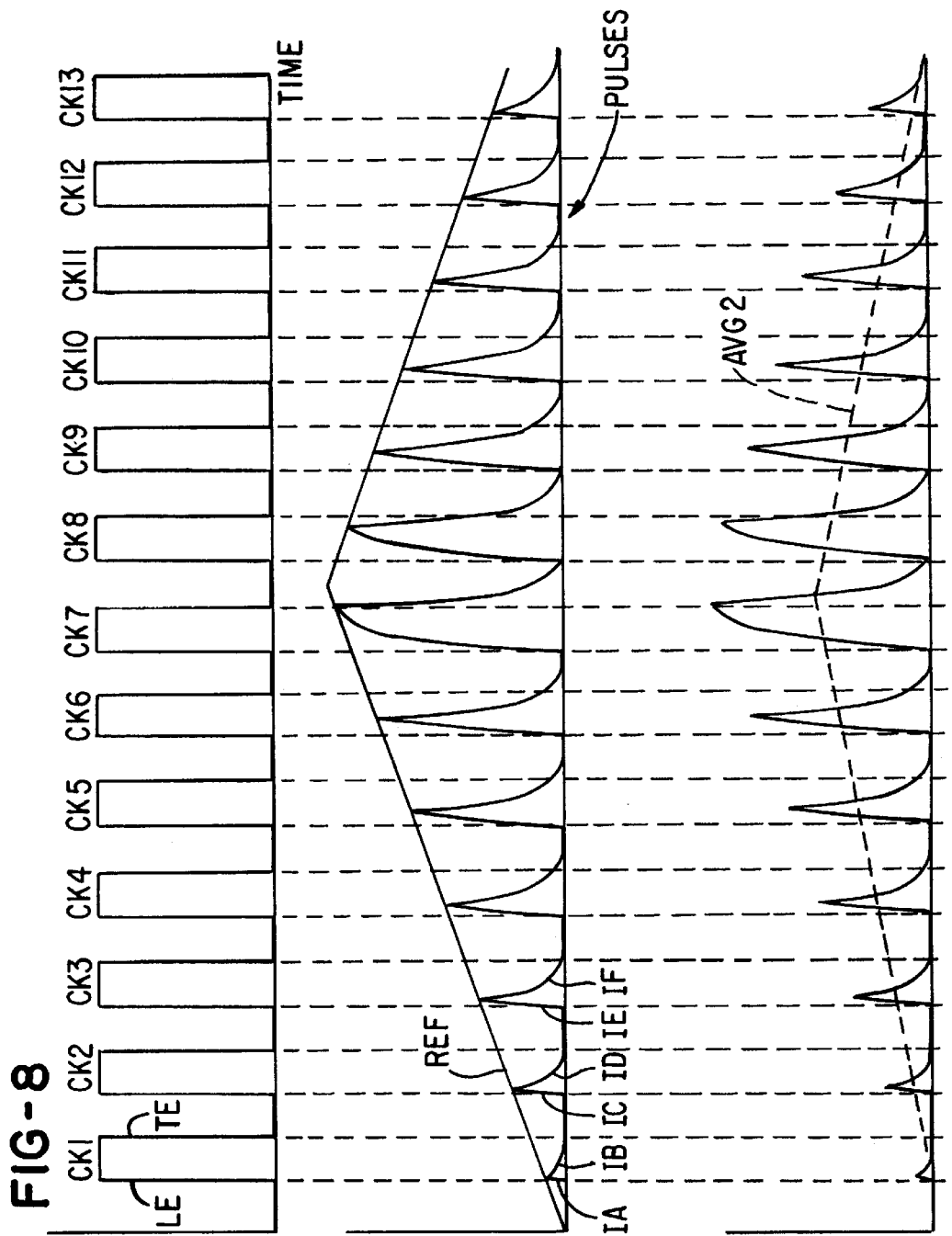
FIG. 8 illustrates three plots of the behavior of the apparatus of FIG. 7.

FIG. 7 illustrates one form of the invention, together with a flow chart of logic which controls switch S. FIG. 8 illustrates output which the invention produces. The output, in this example, is a replica of the waveform REF in FIG. 8, center. This replica is attained by creating the charge-discharge cycle-pairs $(I_A, I_B), (I_C, I_D), (I_E, I_F)$, etc. As shown at the bottom of FIG. 8, they have an average AVG2 which resembles the waveform REF.

In FIG. 7, three primary events take place:
1. Two waveforms are received from an external source: (A) a clock signal, shown at the upper left, and a reference signal REF, shown at the lower right. The reference REF runs at a lower frequency than the clock's frequency;
2. Whenever the clock is high, the flip flop is set and the switch S in FIG. 7 is closed; and
3. While the switch is closed, the current I is compared to the reference REF. If I exceeds REF, the switch is opened, despite the fact that the clock may be high. If I does not exceed REF, the switch is left ON.

A step-by-step analysis will now explain operation of the invention. FIG. 8, top, illustrates the clock, CK. The clock pulses are numbered CK1–CK13. FIG. 8, center, illustrates the reference REF.

Prior to CK1, the switch S is open in FIG. 7, and no current I flows. When the leading edge LE of CK1 arrives, decision block 100 in FIG. 7 closes switch S. Now a charging current $I_A$ in FIG. 8 arises, which is analogous to any of the charging currents approaching a point P1 in FIG. 4.

Block 120 measures the current I. Block 125 receives the value of the reference signal REF which occurs at this instant, which is assumed to be value V1. If current I exceeds REF, then block 135 opens the switch S. Now, a discharging current $I_B$ in FIG. 8, center, occurs.

Then the logic returns to decision block 100. The logic repeats, but, in this iteration, the switch is opened when REF reaches a higher value, namely, V2. The charge-discharge cycle of $I_C$ and $I_D$ is generated.

This repeated operation produces the train of PULSES shown in FIG. 8, center. They have an average value AVG2, shown at FIG. 8, bottom.

Figure 9:
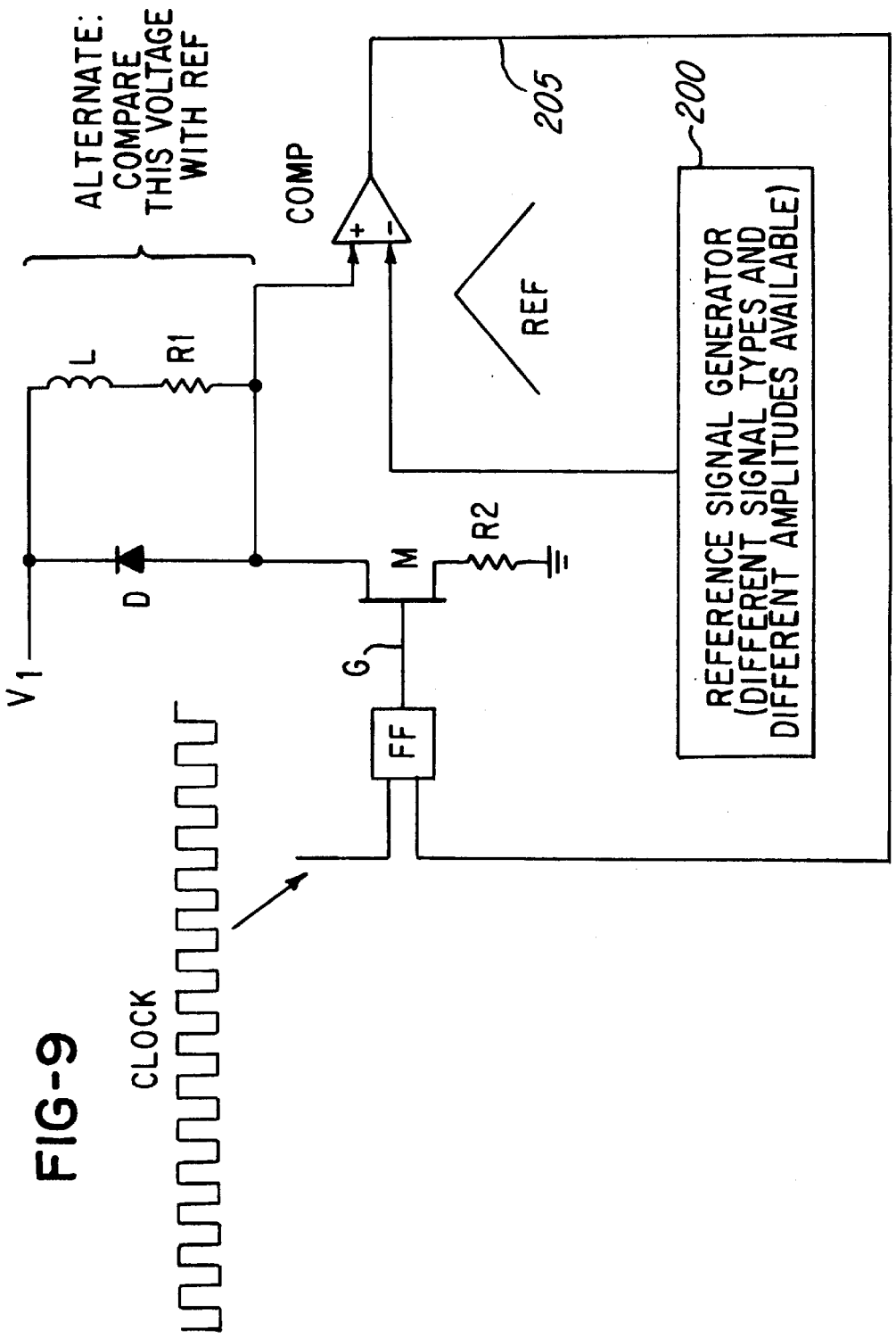
FIG. 9 illustrates another form of the invention.

FIG. 7 illustrated a digital version of the invention. FIG. 9 illustrates an analog version. A small resistor R2, in the range of a few tenths of an ohm, generates a voltage indicative of the current passed by Field-Effect Transistor, FET, M. Other current-measurement techniques are possible. This voltage is compared with a reference REF, which is produced by a signal generator 200. A comparator COMP compares the current-indicating voltage, produced by R2, and the reference REF. When the former exceeds REF, comparator COMP produces a low signal on its output 205. This output 205 is fed to the flip flop.

The operation of the circuit of FIG. 9 follows the logic explained in FIG. 7, although in the analog domain. A high signal applied to the gate G of FET M causes the FET to turn on, that is, to act like a closed switch. This high signal only occurs when both (1) the CLOCK is high, and (2) output 205 is high.

This high signal on gate G is pulled low when the current passed by FET M exceeds reference REF.

Additional Considerations

1. Signal generator 200 in FIG. 9 can generate more than one type of signal, for example, a DC signal, a square wave, a sinusoidal wave, a rectified sinusoid, sawtooth waves, etc. At any given time, the user selects the waveform of interest. These can be adjustable in magnitude, phase, and frequency. Common laboratory signal generators provide these functions.

These adjustments can alter the frequency spectrum of the output plot shown in FIG. 8. The reader is reminded that the invention controls the location of the transition point TRANS, in FIG. 4, top, with respect to period T.

Figure 10:
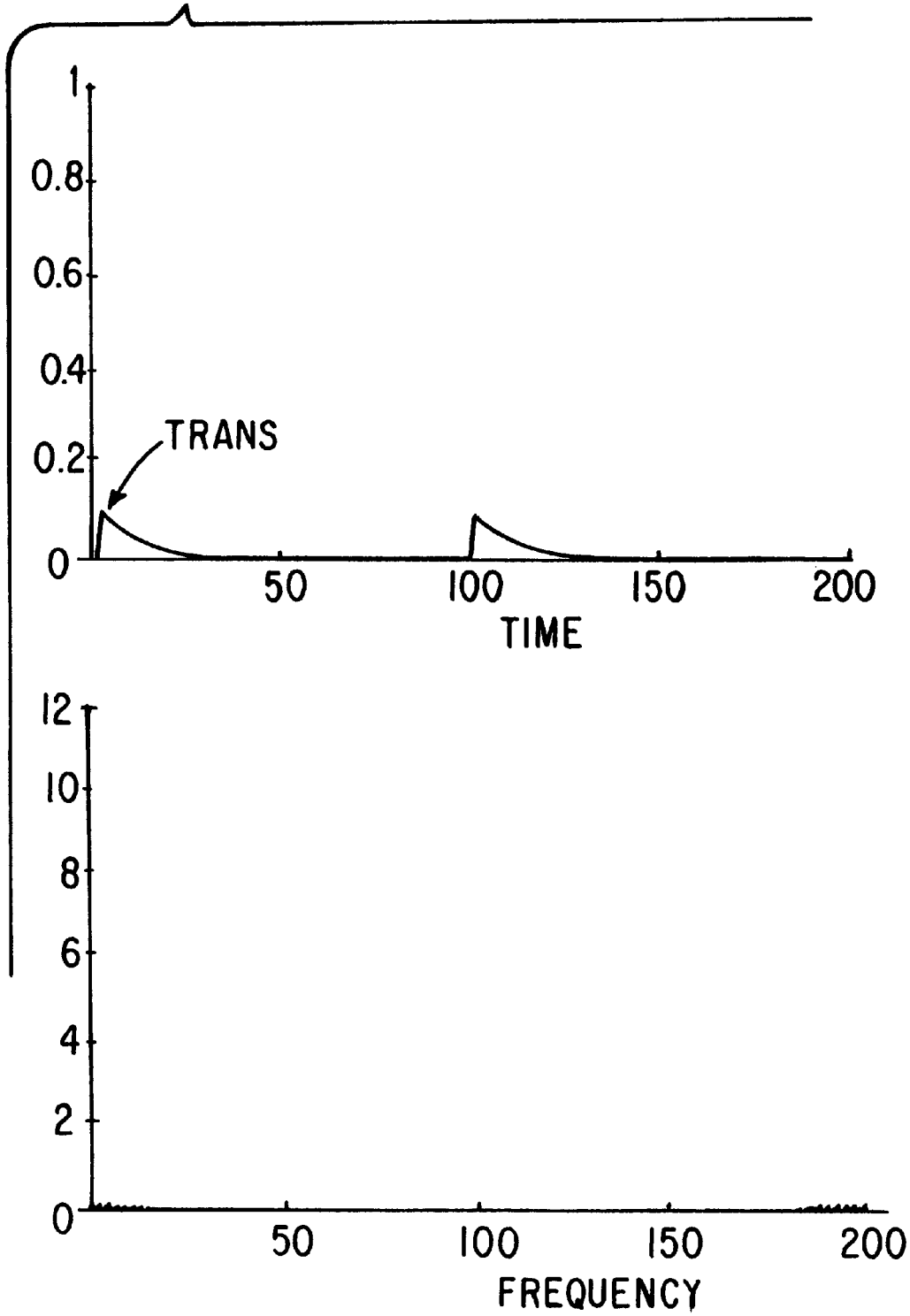
FIGS. 10–17 illustrate various output waveforms produced by the invention, and their corresponding Fourier spectra.

The frequency spectrum of several charge-discharge cycles, having TRANS at different locations, was computed using the software package *MATHEMATICA*, available from Wolfram Research, Champaign, Ill. FIG. 10, top illustrates a waveform having an early transition point TRANS. FIG. 10, bottom, illustrates the frequency spectrum obtained from the Fourier transform of the waveform.

Figure 11:
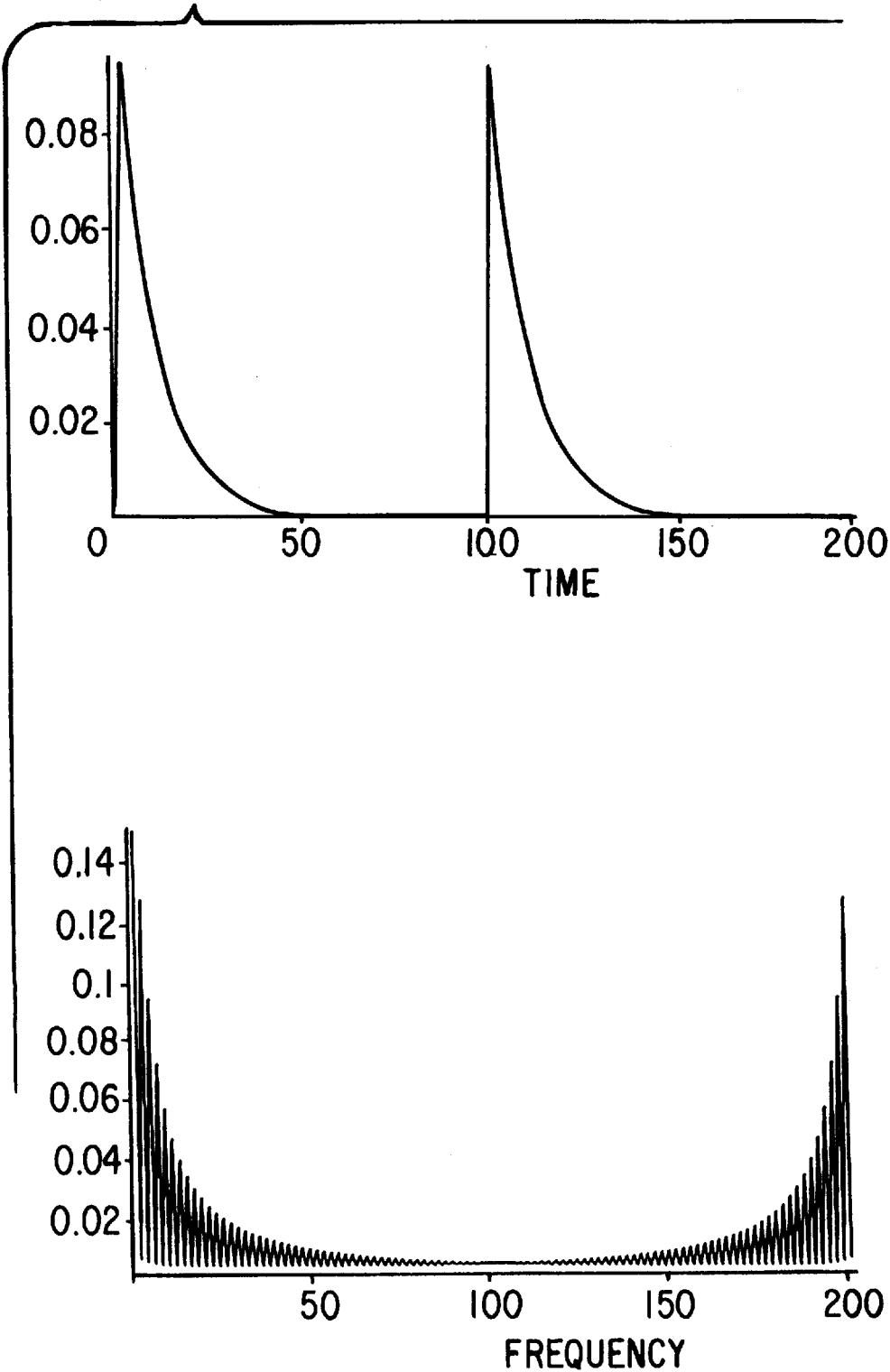

FIG. 11 is a repetition of the computation for FIG. 10, but made with the vertical axes at different scales, to thereby magnify the plots.

Figure 12:
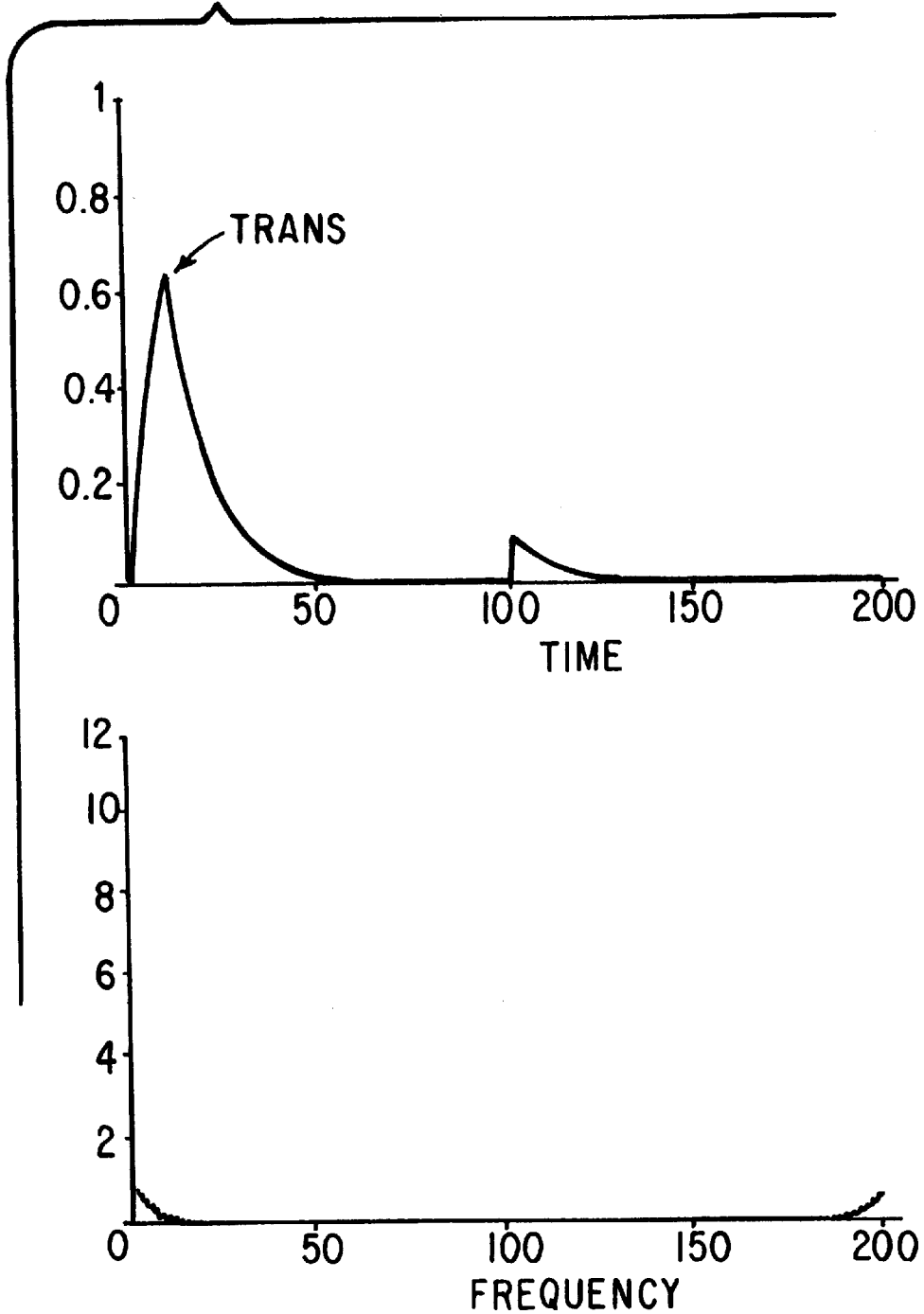

FIG. 12, top, shows a later transition point TRANS. FIG. 12, bottom, shows the frequency spectrum.

Figure 13:
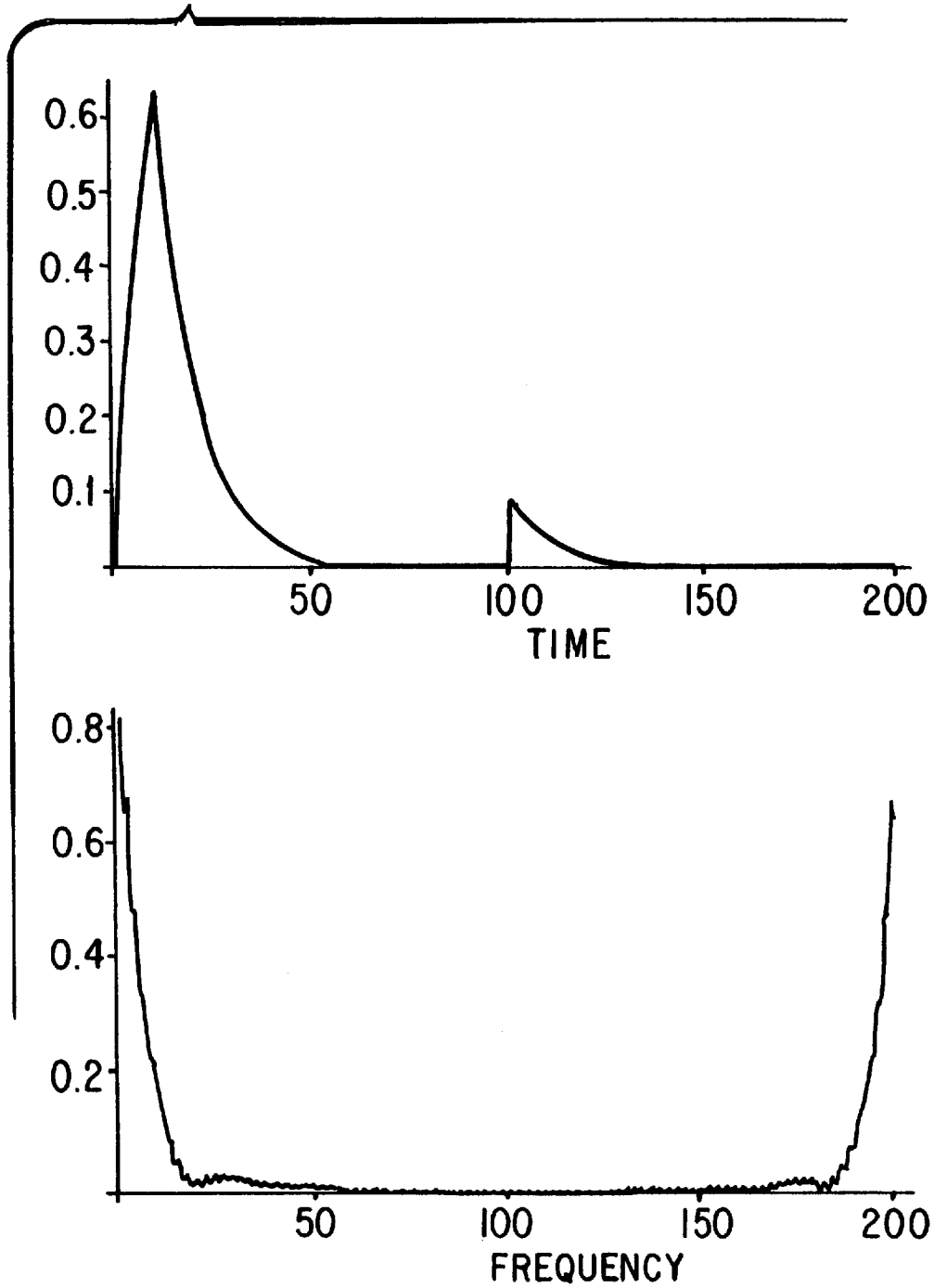

FIG. 13 is a repetition of the computation for FIG. 12, but made with the vertical axes at different scales.

Figure 14:
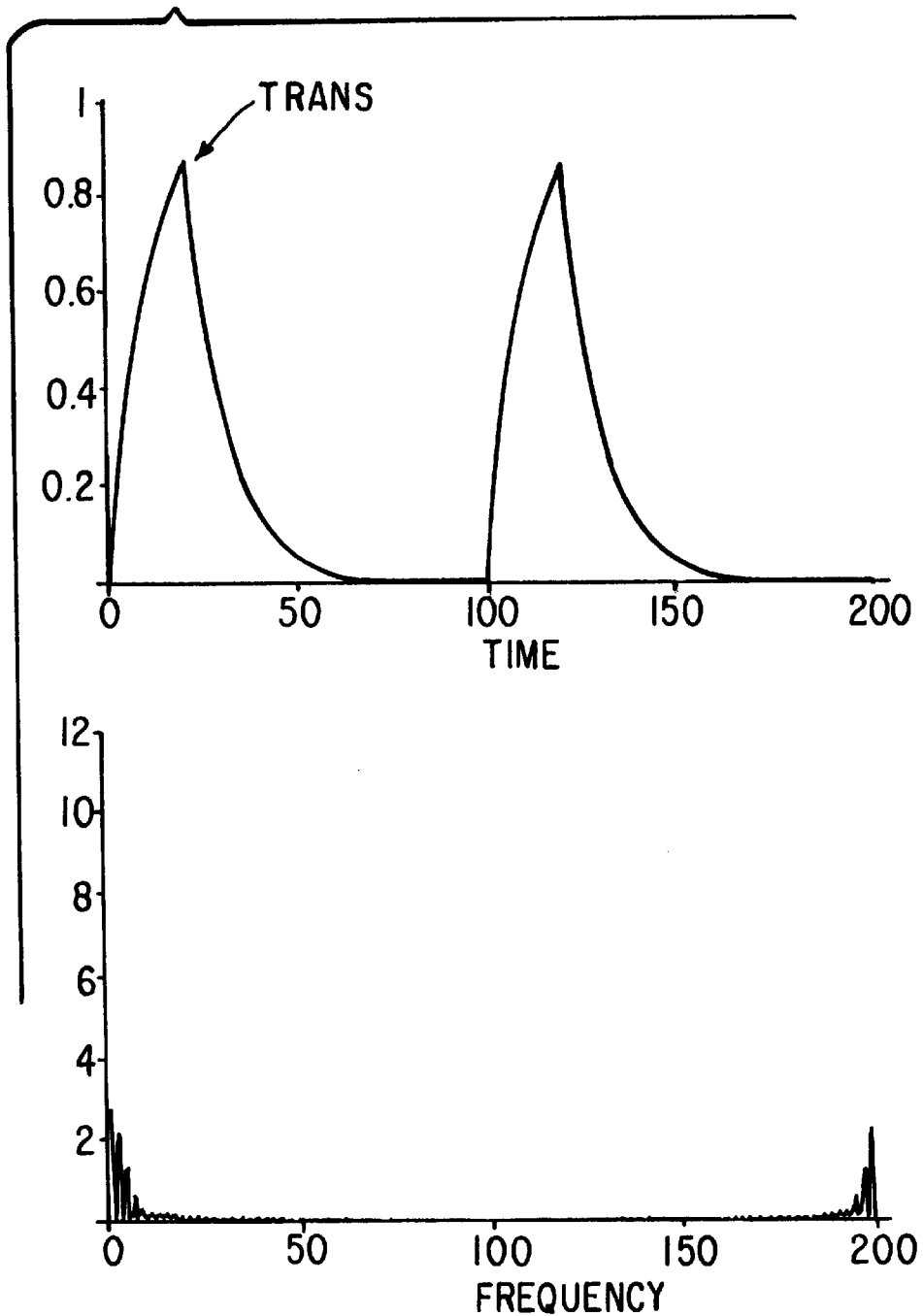

FIG. 14, top, shows a still later transition point TRANS. FIG. 14, bottom, shows the frequency spectrum.

Figure 15:
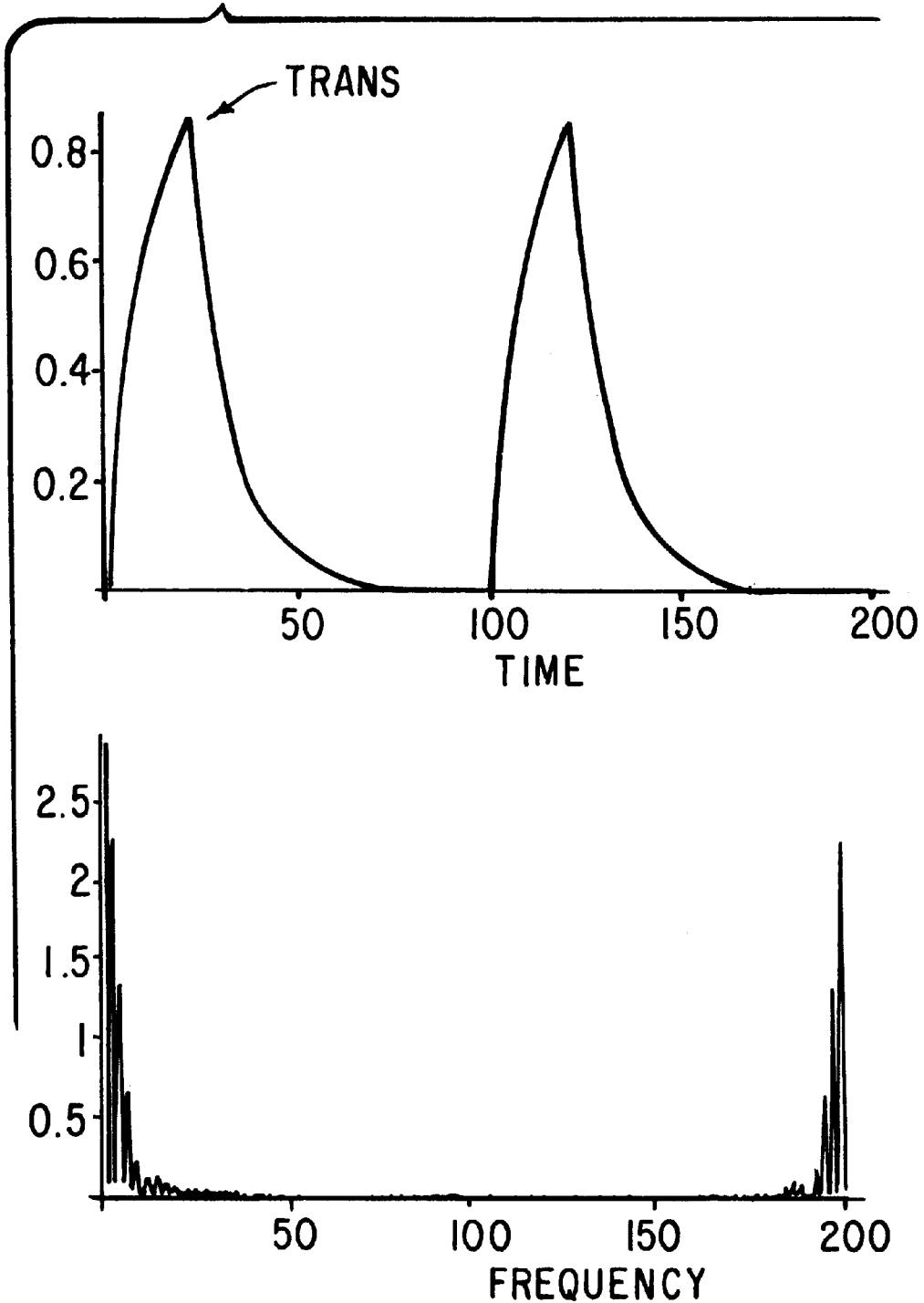

FIG. 15 is a repetition of the computation for FIG. 14, but made with the vertical axes at different scales.

Figure 16:
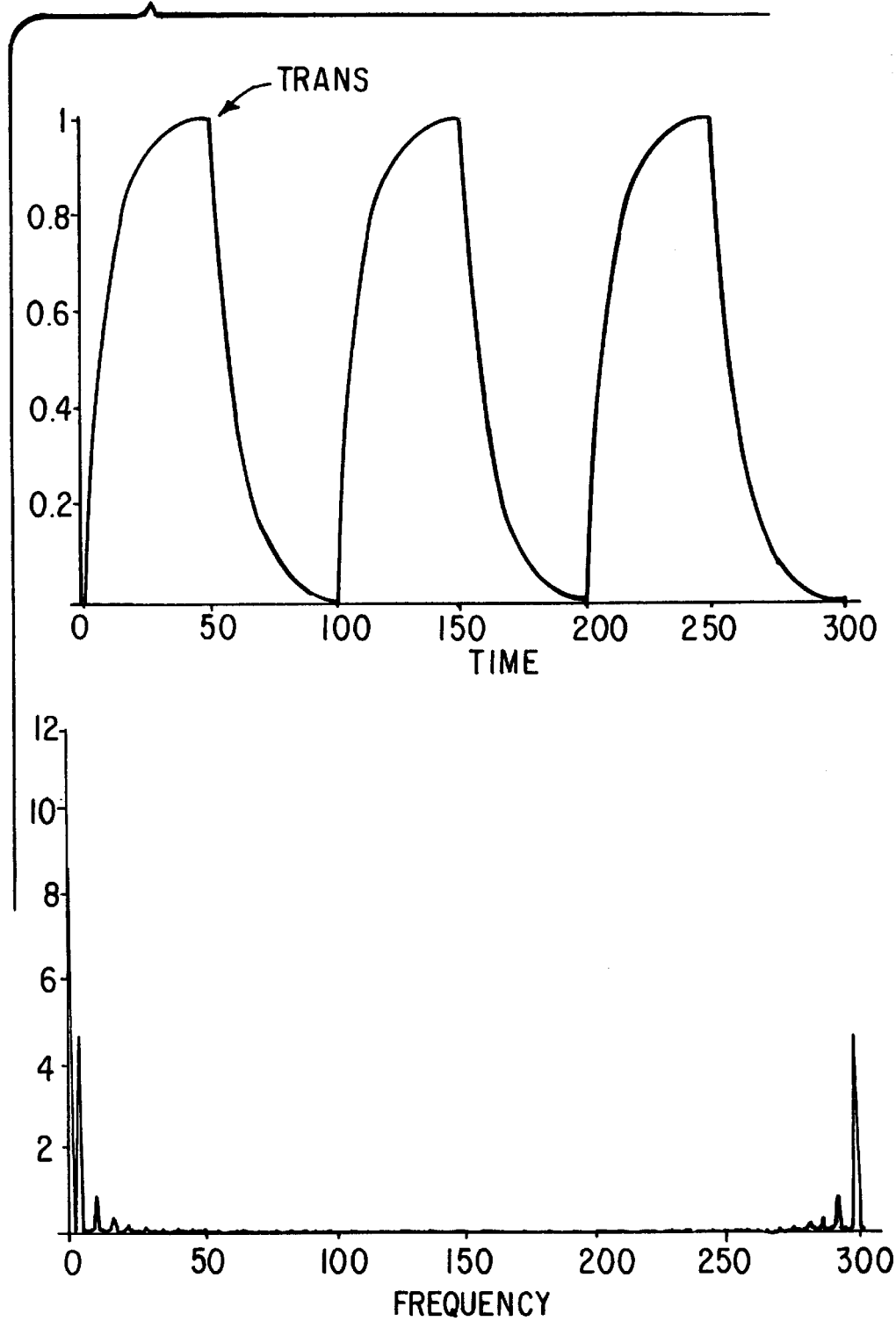

FIG. 16, top, shows a yet later transition point TRANS. FIG. 16, bottom, shows the frequency spectrum.

Figure 17:
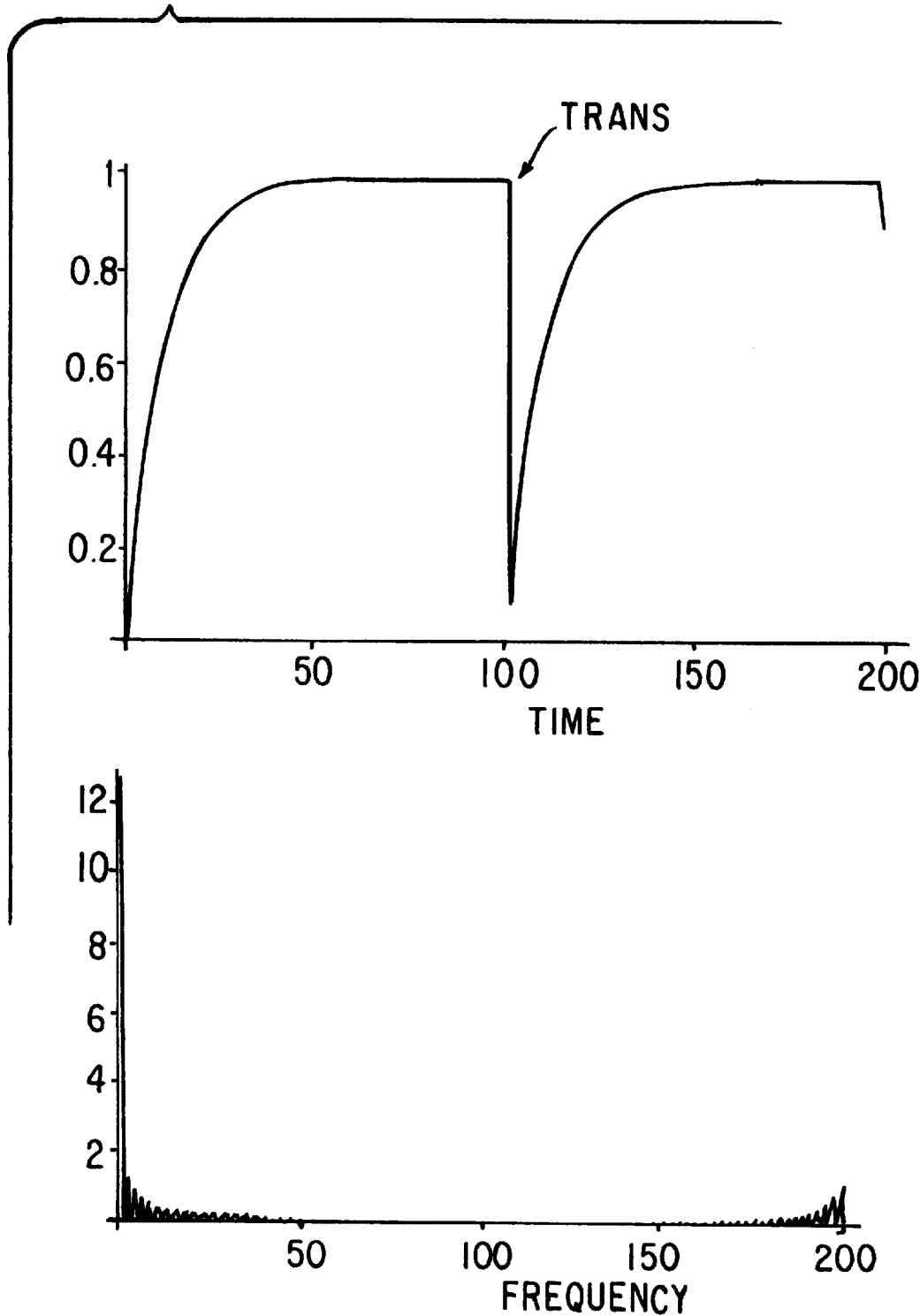

FIG. 17, top, shows a very late transition point TRANS. FIG. 17, bottom, shows the frequency spectrum.

Clearly, the frequency spectrum shifts as the transition point TRANS shifts. The shift in the transition point TRANS continually occurs, as FIG. 8, for example, illustrates. The charge-discharge cycle-pairs grow in amplitude because the transition point TRANS is progressively delayed.

2. The invention is inherently very safe. Overcurrents through FET M in FIG. 9 are inhibited by comparator COMP.

3. A typical clock frequency lies in the range of 5 kHz to 50 kHz. A typical reference frequency lies in the range of a few Hz to a few hundred Hz. Specifically included are 50 Hz, 60 Hz, and other standard electric power frequencies.

4. Instead of measuring current passed by the FET M in FIG. 9, the inductor L and resistor R can represent a load, and a current may be sensed in the load using a sensor (not shown), and compared with REF, as indicated at the upper right of FIG. 9. When that measured voltage exceeds REF, a zero signal is fed to the AND gate, thereby opening FET M. It does not operate at the clock frequency, but requires a bandwidth sufficient to handle the load frequency, which is a few hundred Hz, as just explained.

5. A buck, or step-down, regulator has been described. Other types of regulator can be used with the invention, such as boost (step up), buck-boost (step down, step up), bridge-type circuits, push-pull circuits, and Cuk converters. These are described in chapter 14 of *Reference Data for Engineers: Radio, Electronic, Computer, and Communications*, E. C. Jordan, Editor (SAMS publishing, 7th ed., 1985), ISBN 0-672-21563-2. This chapter is incorporated by reference.

These regulators are generically referred to as "switching" type regulators, because one, or more, transistors is switched from the fully conducting state to the fully off state. They are used to produce power which, with the exception of ripple, is DC-type.

The chapter just identified, on page 16, states, in reference to these circuits: "Load voltage control is provided by adjustment of the repetition rate, pulse width, or on-to-off ratio." However, it is emphasized that this voltage is DC, whereas the invention provides an AC output.

6. Filtering of the output can be done, as by a low-pass filter.

Figure 18:
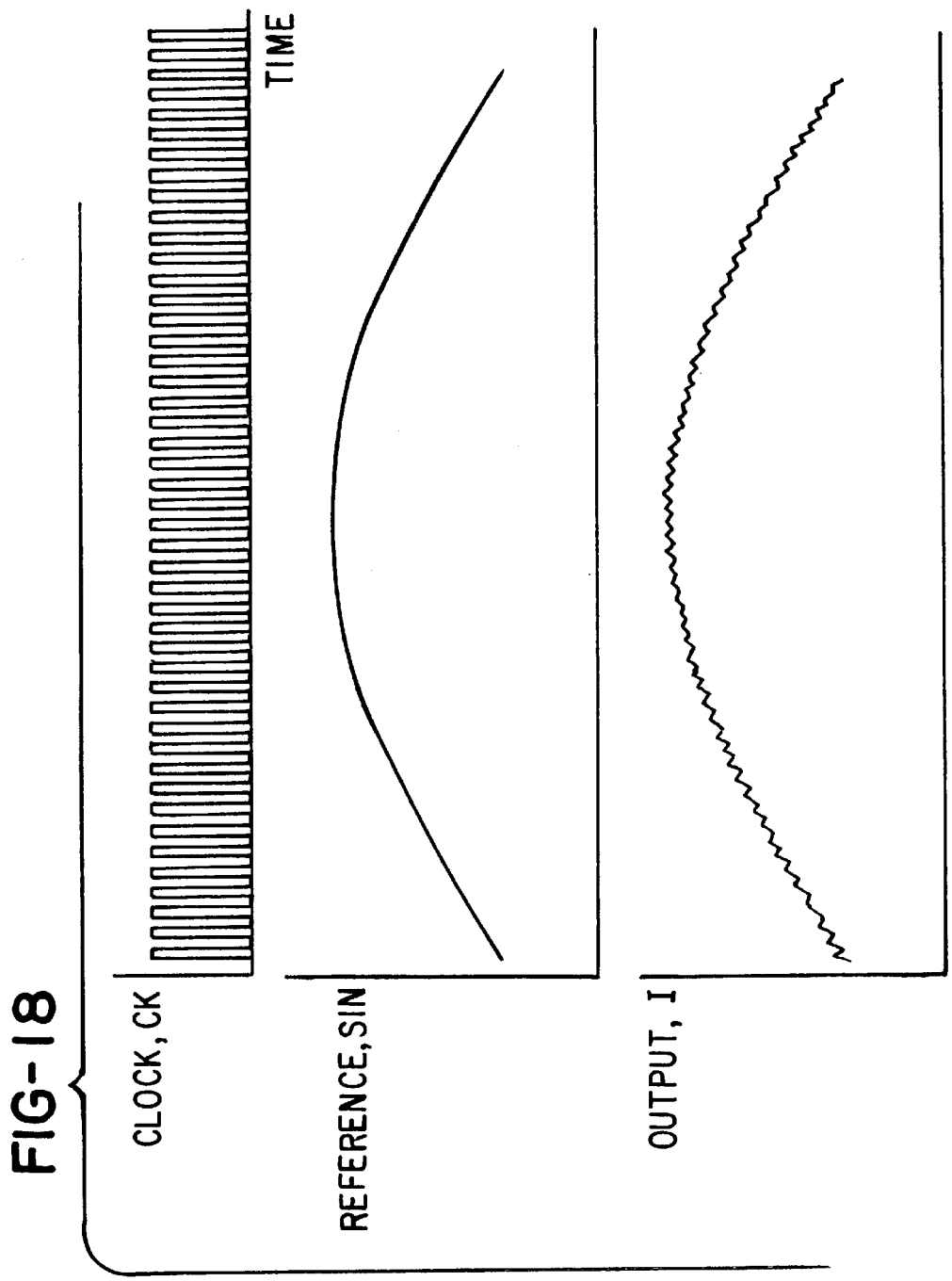
FIG. 18 illustrates how the invention produces an output which is a replica of the reference waveform REF of FIG. 7.

7. FIG. 8 illustrated a very slow clock, in order to illustrate the individual charge-discharge cycles. In actual operation, the clock frequency is quite high, compared with that of the reference waveform. Consequently, the current I in FIG. 7 will assume the form of a magnified replica of the reference waveform, but with a small amount of ripple. FIG. 18 provides an example. A fast clock CK is shown. If the reference waveform is a sinusoid SIN, then the current I will be a magnified replica, but "fuzzy," due to the ripple, as shown at the bottom of the Figure.

8. The reference waveform REF in FIGS. 7 and 8 is small in magnitude, and does not supply much current, because the input impedance of comparator COMP is very high. One, or a few, milliamps would be considered excessive. Thus, the reference waveform is a "signal" waveform. It is not used to deliver significant power.

Conversely, the current I is a power signal. It can deliver tens, hundreds, or thousands of watts. As a specific example, a representative reference signal REF may deliver a few milliwatts, but the current I may carry hundreds of watts, or even several kilowatts.

Additional Embodiments

Figure 19:
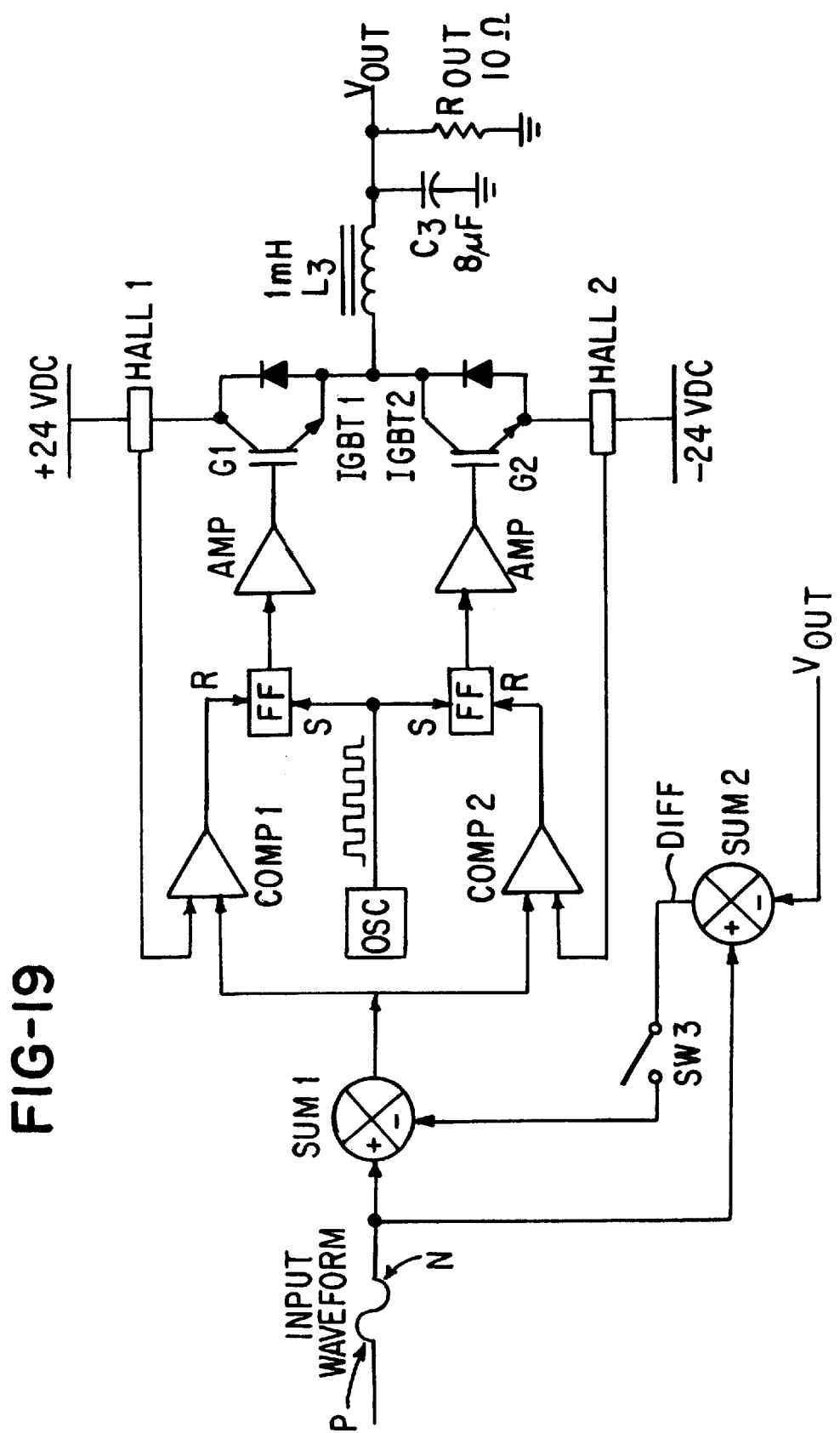
FIG. 19 illustrates one form of the invention.

FIG. 19 illustrates another form of the invention. Two power supplies, labeled +24 VDC and −24 VDC, supply current to a load $R_{OOUT}$. Inductor $L_3$ and capacitor $C_3$ have the values indicated.

Two switches, in the form of IGBT1 and IGBT2 control the current. Two Hall probes, labeled HALL1 and HALL2, sense the current through the respective switches. Two flip-flops FF control the voltages of the gates G of the respective switches, through voltage amplifiers AMP. An oscillator OSC is connected to the "set" input of both flip-flops FF. Comparators COMP1 and COMP2 feed the "reset" inputs of the flip-flops FF.

The apparatus can be divided into two sub-parts, shown in FIGS. 20 and 21, each of which operate as described above, in connection with FIG. 7.

FIG. 20 illustrates operation during the positive half-cycle P of the INPUT WAVEFORM. In FIG. 20, only the components of FIG. 19 which are active during the positive half-cycle P are shown. The Oscillator OSC continually clocks the "set" input S of the flip-flop FF1. Each clock pulse causes the flip-flip FF1 to turn on IGBT1, thereby allowing current I to flow. IGBT1 sources current to the resistor R3. During each clock pulse, the current I, measured by HALL1, is compared with the INPUT WAVEFORM, by comparator COMP1. When the current reaches the value of the INPUT WAVEFORM, COMP1 activates the "reset" input of the flip-flop FF1, thereby turning off IGBT1. This process repeats, producing the output voltage $V_{OUT}$ having the positive half-waveform P2 indicated.

FIG. 21 illustrates operation during the negative half-cycle P of the INPUT WAVEFORM. In FIG. 21, only the components of FIG. 19 which are active during the positive half-cycle P are shown. The Oscillator OSC continually clocks the "set" input S of the flip-flop FF2. Each clock pulse causes the flip-flip FF2 to turn on IGBT2, thereby allowing current I to flow. IGBT2 sinks current from the resistor R3. During each clock pulse, the current I, measured by HALL2, is compared with the INPUT WAVEFORM, by comparator COMP2. When the current reaches the value of the INPUT WAVEFORM, COMP2 activates the "reset" input of the flip-flop FF2, thereby turning off IGBT2. This process repeats, producing the output voltage $V_{OUT}$ having the negative half-waveform N2 indicated.

Feedback can be provided, by closing switch SW3 in FIG. 19. Summer SUM2 subtracts the output voltage $V_{OUT}$ from the INPUT WAVEFORM, to produce a difference signal DIFF. The signal DIFF is subtracted from the INPUT WAVEFORM in summer SUM1, thereby causing $V_{OUT}$ to more closely follow the INPUT WAVEFORM.

The current which is sensed, and used to control switching, could be that passing through load leg L3 in FIG. 19. The two Hall-effect sensors can be replaced by one sensor on leg L3 which senses current in L3 and switching of IGBT is accomplished in similar manner.

Numerous substitutions and modifications can be undertaken without departing from the true spirit and scope of the invention. What is desired to be secured by Letters Patent is the invention as defined in the following claims.

What is claimed is:

1. In a switching power supply, which contains a switch which pulses current through an inductor, the improvement comprising:
   a) means for measuring a current controlled by the switch; and
   b) means for comparing that current with a time-varying reference and, at the time of comparison, if the current exceeds the reference, opening the switch, wherein
      i) the time-varying reference is generated by a signal generator,
      ii) the signal generator accepts user input and, in response, changes the waveform of the time-varying reference.

2. The improvement according to claim 1, wherein the reference is a sinusoid.

3. The improvement according to claim 1, wherein a sinusoidal output current is produced.

4. The improvement according to claim 1, wherein the time-varying reference is generated independently of the output of the power supply.

5. The improvement according to claim 1, wherein the time-varying reference is generated independently of the current passing through the switch.

6. The improvement according to claim 1, wherein the time-varying reference is generated by a signal generator having an existence separate from the power supply.

7. The improvement according to claim 1, wherein
   i) the power supply produces an output waveform, and
   ii) the output waveform is a replica of the time-varying reference.

8. The improvement according to claim 7, wherein the reference is a sinusoid.

9. The improvement according to claim 7, wherein a sinusoidal output current is produced.

10. The improvement according to claim 7, wherein the time-varying reference is generated independently of the output of the power supply.

11. The improvement according to claim 7, wherein the time-varying reference is generated independently of the current passing through the switch.

12. The improvement according to claim 7, wherein the time-varying reference is generated by a signal generator having an existence separate from the power supply.

* * * * *